Figure 1:
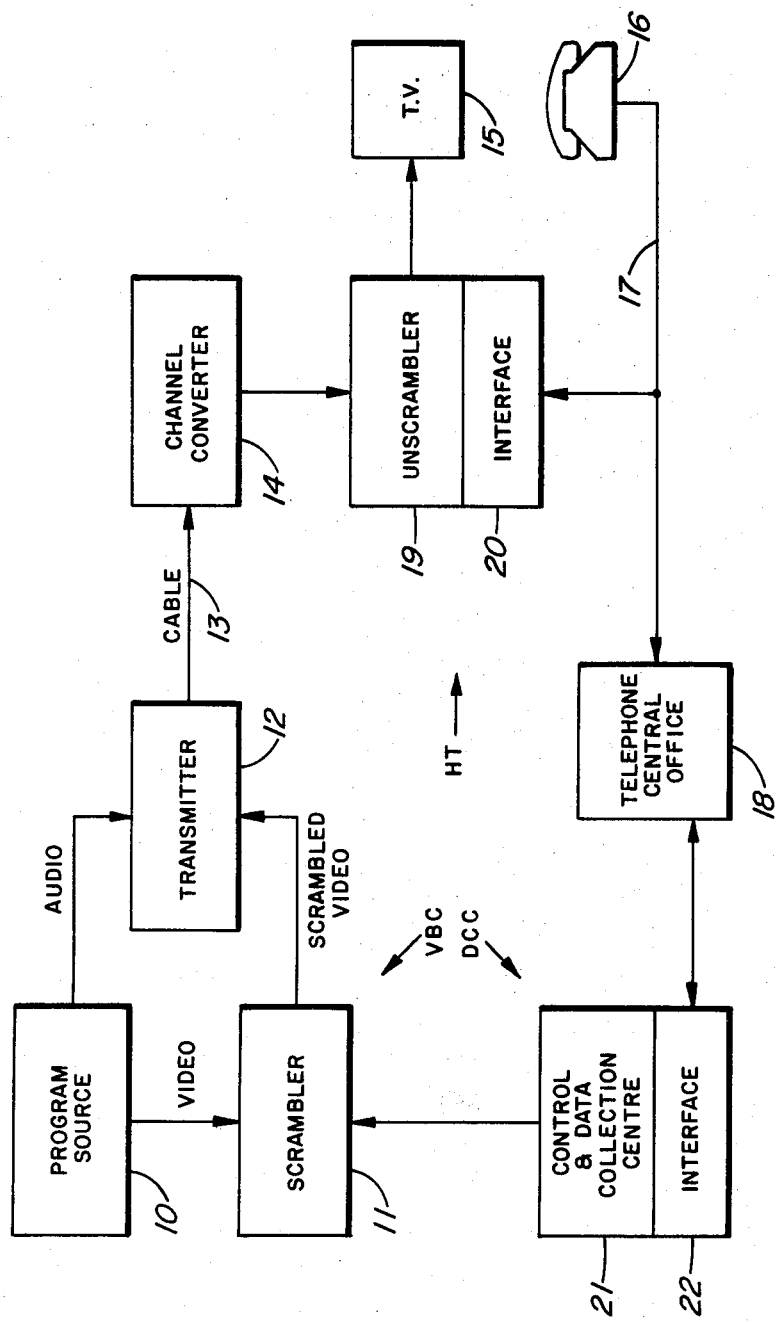

United States Patent [19]
Aminetzah

[11] 4,388,643
[45] Jun. 14, 1983

[54] METHOD OF CONTROLLING SCRAMBLING AND UNSCRAMBLING IN A PAY TV SYSTEM

[75] Inventor: Yehuda J. Aminetzah, Nepean, Canada

[73] Assignee: Northern Telecom Limited, Montreal, Canada

[21] Appl. No.: 251,085

[22] Filed: Apr. 6, 1981

[51] Int. Cl.³ .......................... H04N 7/16; H04L 9/00
[52] U.S. Cl. ................................ 358/123; 178/22.08; 178/22.13; 358/114; 358/117; 358/122
[58] Field of Search ............... 178/22.08, 22.09, 22.13, 178/22.16, 22.17; 358/114, 117, 122, 123

[56] References Cited
U.S. PATENT DOCUMENTS

| | | | |
|---|---|---|---|
| 3,906,460 | 9/1975 | Halpern | 178/22.08 |
| 4,068,264 | 1/1978 | Pires | 358/122 |
| 4,081,832 | 3/1978 | Sherman | 358/124 |
| 4,115,807 | 9/1978 | Pires | 358/124 |
| 4,163,254 | 7/1979 | Block et al. | 358/122 |
| 4,238,854 | 12/1980 | Ehrsam et al. | 178/22.16 |
| 4,292,650 | 9/1981 | Hendrickson | 358/122 |
| 4,323,921 | 4/1982 | Guillou | 358/114 |
| 4,337,483 | 6/1982 | Guillou | 358/114 |

FOREIGN PATENT DOCUMENTS 2068691 8/1981 United Kingdom ............ 178/22.05

Primary Examiner—S. C. Buczinski
Attorney, Agent, or Firm—R. John Haley

[57] ABSTRACT

Scrambling of a video signal in a pay TV system is effected in dependence upon a first variable which is changed recurrently, e.g. monthly, and a second variable which changes from field to field. For each field the second variable and other data are transmitted simultaneously with the video signal together with check data produced from the transmitted data and a third variable which is changed recurrently. The first and third variables are recurrently transmitted to each authorized subscriber station, encoded in dependence upon a subscriber number stored in the subscriber station. In the subscriber station, unscrambling is effected in dependence upon the stored first variable and the transmitted second variable after the transmitted data is checked using the check data and the stored third variable. The first variable is conveniently different for different types of television programs, the type of television program being identified by the other data transmitted simultaneously with the video signal.

11 Claims, 4 Drawing Figures

METHOD OF CONTROLLING SCRAMBLING AND UNSCRAMBLING IN A PAY TV SYSTEM

This invention relates to a method of controlling scrambling and unscrambling in a pay TV system.

It is well known in the art of pay TV systems to scramble a video signal, in any of a variety of different ways, prior to broadcasting it by cable or transmission via free space, with the intent that only authorized subscribers equipped with an appropriate unscrambler should be able to unscramble the video signal in return for payment of a fee. The security of the pay TV system, i.e. the degree to which unauthorized persons are prevented from unscrambling the video signal, depends upon the nature of the scrambling process and the security of any coding which is employed. If a pay TV system uses no coding, then any person obtaining an appropriate unscrambler can unscramble the video signal. Such a system is obviously insecure in that unauthorized persons are readily able to unscramble the video signal.

A pay TV system which incorporates coding is disclosed in Sherman U.S. Pat. No. 4,081,832 issued Mar. 28, 1978. In this prior art system the video signal is scrambled, for example by inversion of selected groups of video signal lines, in accordance with a predetermined code which is punched on a card which is mailed to a subscriber. Information as to which group of lines is inverted in any particular video signal field is transmitted to the subscriber with the scrambled video signal. The card mailed to the subscriber also contains a subscriber number which is compared with a number stored at the subscriber station in the form of wired jumpers, and contains an area/month code which is compared with an area/month code transmitted with the scrambled video signal. If these comparisons are satisfied, decoding means at the subscriber station are enabled to unscramble the video signal using the transmitted information and the code on the card, the card being punched to indicate acceptance of a TV program. The punched card is subsequently returned by mail for billing of the subscriber.

Whilst this prior art system provides some security due to the coding employed, it is easily defeated or cheated. Thus the decoding means can readily be permanently enabled, and the code on the card and the transmitted information can still be used to unscramble the video signal while the punch for punching the card is rendered inoperable to prevent billing for a program which is viewed. Furthermore, the code on the card can simply be used to enable unscrambling of the video signal by other apparatus without payment.

The use of a punched card as discussed above, to supply a code to a subscriber and for billing purposes, can be avoided by using a two-way transmission link, such as the subscriber's telephone line, for communication, as described in Block et al. U.S. Pat. No. 4,163,254 issued July 31, 1979. In the pay TV system described therein a program identification code, transmitted with the scrambled video signal, is stored in respect of each program which is unscrambled, and the stored codes are accessed via the telephone line periodically for billing purposes. A scramble code comparator compares a scramble code, transmitted with the scrambled video signal, with a stored scramble code provided via the telephone line, to produce signals for unscrambling. Thus this system provides only a small degree of security through coding, and again it is relatively easy for unauthorized persons to defeat or cheat the system.

Accordingly, a need exists to provide a more secure coding system for use in encoding control signals for enabling unscrambling of a video signal in a pay TV system, particularly in a pay TV system which uses scrambling procedures which are themselves difficult to defeat directly, i.e. without use of the appropriate control signals. Such a pay TV system forms the subject of a copending application Ser. No. 246,878 by J. A. Bond, Y. Li, and L. J. Crane filed on Mar. 23, 1981 and entitled "Scrambling and Unscrambling Video Signals in a Pay TV System", the entire disclosure of which is hereby incorporated herein by reference.

An object of this invention, therefore, is to provide an improved method of controlling scrambling and unscrambling of a video signal in a pay TV system.

According to one aspect, this invention provides a method of controlling scrambling and unscrambling of a video signal in a pay TV system, comprising the steps of: storing a subscriber number at a subscriber station; recurrently transmitting to the subscriber station a first variable encoded in dependence upon the subscriber number; decoding the first variable at the subscriber station using the stored subscriber number, and storing the first variable before or after said decoding; scrambling the video signal in dependence upon the first variable and a second variable; transmitting the second variable to the subscriber station simultaneously with transmission of the scrambled video signal; and at the subscriber station, unscrambling the video signal in dependence upon the decoded stored first variable and the transmitted second variable.

According to another aspect, this invention provides a method of controlling scrambling and unscrambling of a video signal in a pay TV system, comprising the steps of: storing a subscriber number at a subscriber station; scrambling the video signal in dependence upon first and second variables; recurrently transmitting to the subscriber station the first variable and a third variable each encoded in dependence upon the subscriber number; decoding the first and third variables at the subscriber station using the stored subscriber number, and storing the first and third variables before or after said decoding; producing check data from the second and third variables; transmitting the second variable and the check data to the subscriber station simultaneously with the transmission of the scrambled video signal; and at the subscriber station, generating check data from the transmitted second variable and the decoded stored third variable, enabling unscrambling of the video signal in dependence upon a comparison of this generated check data with the transmitted check data, and unscrambling the video signal in dependence upon the decoded stored first variable and the transmitted second variable. The first and third variables are preferably stored after said decoding.

Thus in accordance with the invention first and third variables, DK and ICK in the embodiment described below, which are conveniently produced using a random number generator so that the variables can not be predicted, are transmitted recurrently (e.g. monthly) to a subscriber station, encoded in accordance with a subscriber number so that only the intended subscriber station can decode these variables. The first variable DK is used together with a second variable, PD as described below, which is transmitted simultaneously with the video signal and which can change from field to field, to scramble the video signal prior to transmission and, in the subscriber station, to unscramble the video signal for viewing.

The third variable is used to produce from the second variable, and possibly also any other data which is transmitted therewith, check data (IC as described below) which is transmitted with the second variable and is used in the subscriber station to check that the information received in the respective field is correct; if so unscrambling is enabled. In order to permit proper unscrambling when the information received is occasionally faulty, preferably the second variable is produced for each field of the video signal using a pseudo-random number generator, and additionally said second variable is produced for each field using a pseudo-random number generator at the subscriber station, synchronized with the transmitted second variable, and in the event that the check data comparison indicates an error the video signal is unscrambled in dependence upon the decoded stored first variable and the second variable generated at the subscriber station.

As a protection against faulty operation, preferably the method includes the steps of storing an accumulated error count at the subscriber station, incrementing said count in response to errors indicated by the check data comparison, and inhibiting unscrambling of the video signal in response to said count reaching a predetermined value.

In order to enable various subscription requirements to be satisfied selectively, preferably the method comprises the steps of: producing different said first variables for different types of television program; selectively recurrently transmitting said different first variables to the subscriber station for decoding and storage therein; scrambling the video signal in dependence upon the respective first variable, for the type of television program to which the video signal relates, and the second variable; transmitting, with said second variable, data representing the type of television program to which the scrambled video signal relates; and at the subscriber station, selecting the respective decoded stored first variable in dependence upon said data representing the type of television program for unscrambling the video signal.

Figure 2:
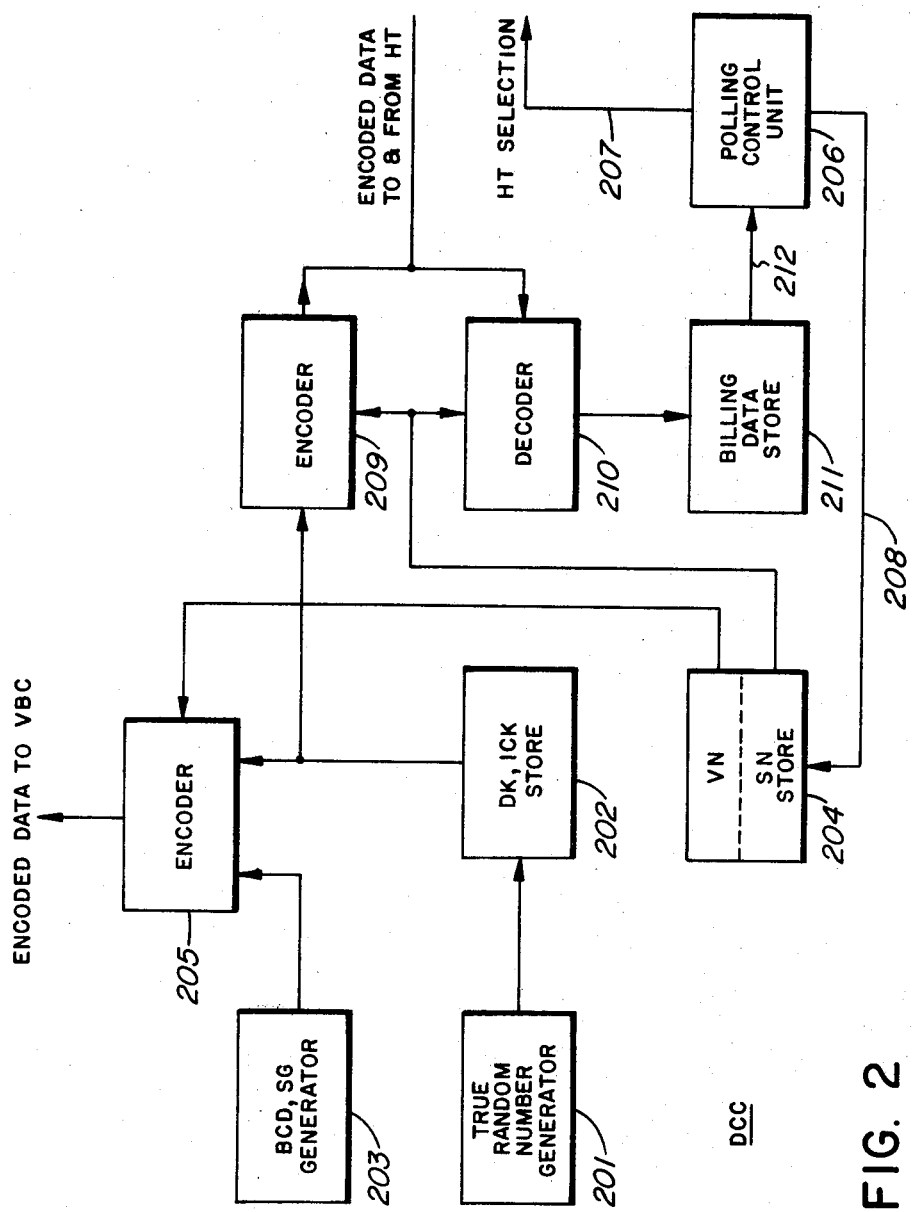
Figure 3:
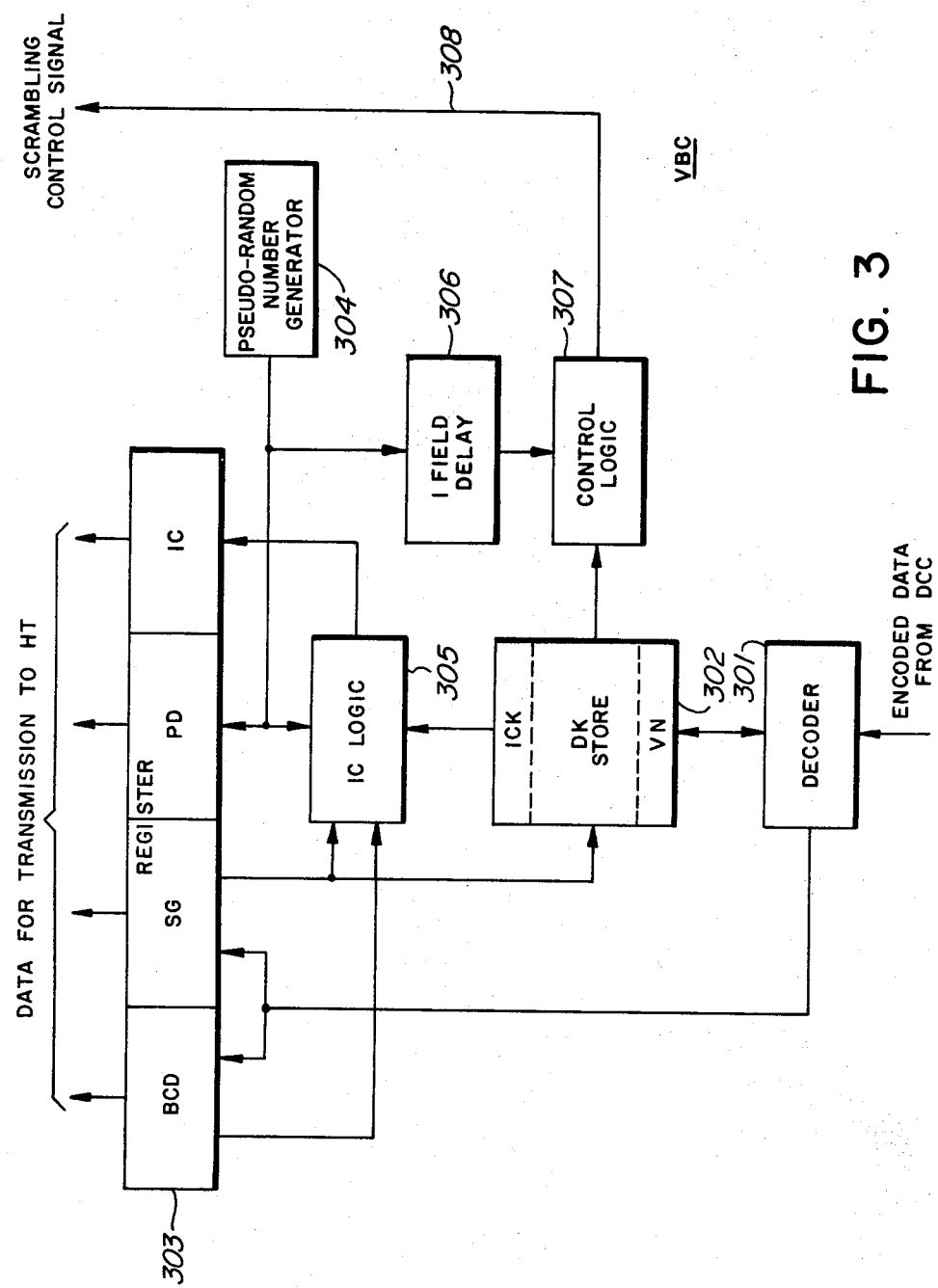
Figure 4:
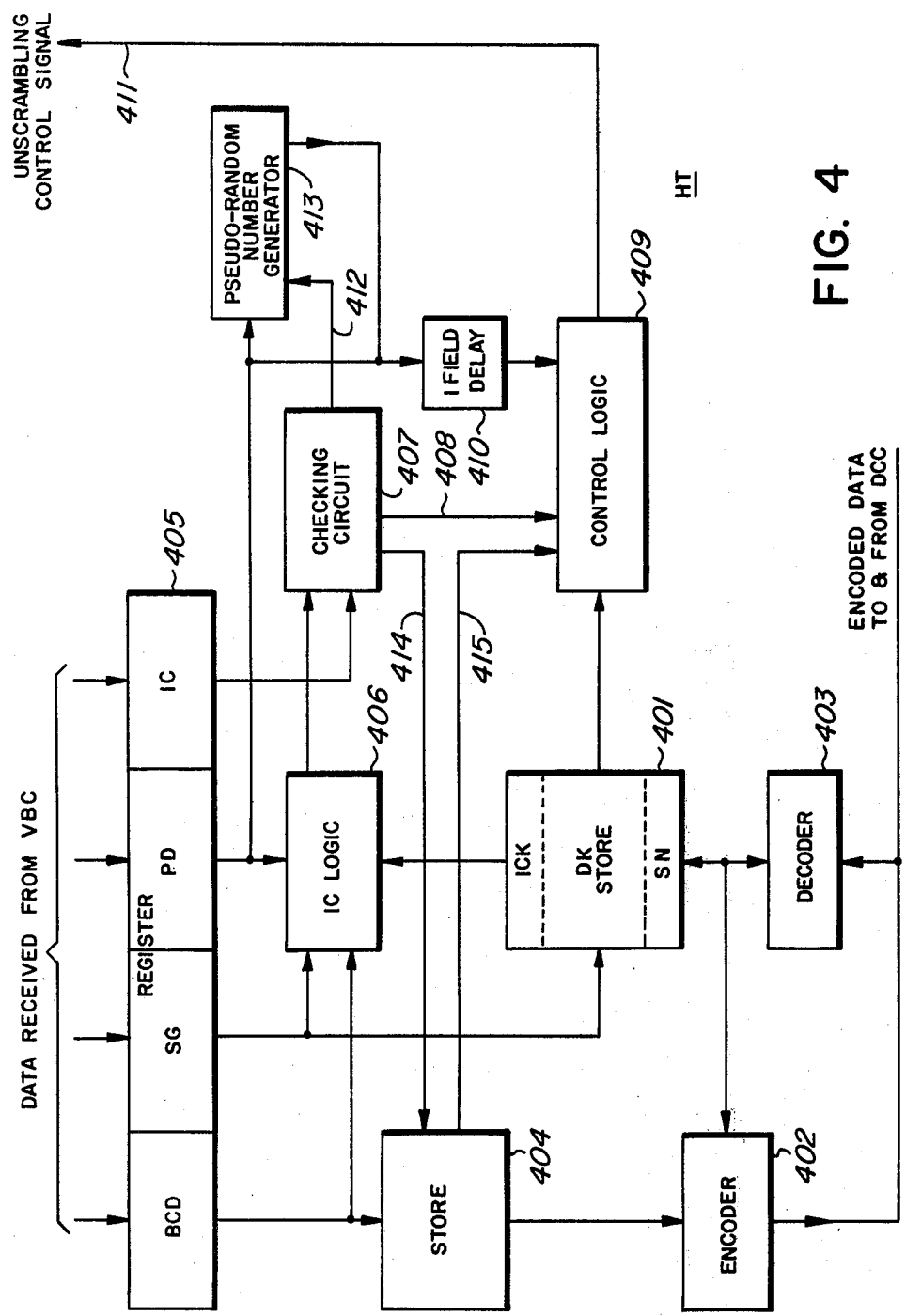

The invention will be further understood from the following description with reference to the accompanying drawings, in which:

FIG. 1 shows a block diagram of parts of a pay TV system which include a video broadcast centre VBC, a subscriber's home terminal HT, and a control and data collection centre DCC; and FIGS. 2, 3, and 4 are diagrams illustrating the manner in which scrambling and unscrambling are controlled in the pay TV system, these figures relating to the DCC, VBC, and HT respectively.

Referring to FIG. 1, there is shown therein parts of a pay TV system in which video signals from a program source 10 are scrambled in a scrambler 11, the resultant scrambled video signals and audio signals from the program source being supplied to a transmitter 12 for broadcasting to subscribers of the pay TV system. As shown, the audio signals are not scrambled, but they could also be scrambled in known manner if desired. The broadcast signals are illustratively supplied to a subscriber's home via a cable 13, but they could alternatively be supplied by electromagnetic radiation, directly or via a satellite link. The units 10, 11, and 12 constitute a video broadcast centre VBC.

The subscriber's home includes a conventional channel converter 14, television receiver 15, and telephone 16, the latter being connected via a coventional telephone line 17 to a telephone central office 18. An unscrambler 19 is coupled between the output of the channel converter 14 and the input of the television receiver 15, and is also coupled via an interface circuit 20 to the telephone line 17. The interface circuit 20 is preferably of the type described in a co-pending patent application Ser. No. 247,229 filed on Mar. 25, 1981 by T. H. Murto and S. D. Alvey, entitled "Interface Circuits for Connection to Non-Dedicated Telephone Lines", the entire disclosure of which is hereby incorporated herein by reference. The unscrambler 19 and interface circuit 20 constitute a home terminal HT.

The pay TV system also includes a control and data collection centre (DDC) 21, which can be located at the program source 10, scrambler 11, and transmitter 12, or at the telephone central office 18, or separately from both as is assumed here. In any event the centre 21 is coupled via an appropriate interface 22 to the telephone central office 18 for communicating recurrently with each unscrambler 19 via the relevant telephone line 17, and is coupled, either permanently or when required via a telephone or data transmission line, to the scrambler 11 for supplying encryption and program data thereto. As an alternative, which is not further described here but which will be readily understood by those skilled in the art, the program data may instead originate in the program source 10, and be supplied from there to both the scrambler 11 and the centre 21.

The centre 21 recurrently, for example monthly, supplies data to the scrambler 11 as described below to control the scrambling of video signals from the program source 10. The scrambling and unscrambling can be effected in any of numerous different known ways, but are preferably effected in the manner described in the copending application by J. A. Bond et al. already referred to. As also described in that application, data relating to the scrambling and to the program material is separately transmitted simultaneously with the scrambled video signal. The centre 21 also recurrently, for example monthly, supplies via the interface 22, the telephone central office 18, and the interface 20 information which as described below is used by the unscrambler 19 to enable unscrambling of the video signals for reproduction thereof on the television receiver 15.

The scrambling and unscrambling are effected under the control of a first variable DK, a second variable PD, and a third variable ICK. The first and third variables DK and ICK change recurrently with relatively long periods between changes. For example, these variables are changed monthly. The second variable PD changes recurrently at a much higher rate; for example this variable changes from one field of the video signal to the next. In order to identify uniquely each unscrambler 19, each home terminal HT is assigned a subscriber number SN in dependence upon which all information transmitted between the DCC and the respective HT is encoded. Similarly, information transmitted between the DCC and the VBC is encoded in dependence upon a number VN.

Referring to FIG. 2, the DCC includes a true random number generator 201 from the output of which the first variable DK and the third variable ICK are derived and securely stored in a store 202. These variables are thus produced completely randomly. A different first variable DK is produced and stored for each of a plurality of groups SG of television programs, so that subscribers can subscribe selectively to different groups or types of television programs. A generator 203 provides data SG identifying each such group, and program, billing, and control data BCD relating to the respective programs.

A store 204 stores the number VN, which is supplied to an encoder 205 which encodes the data BCD and SG from the generator 203 and the variables DK and ICK in dependence upon this number for recurrent transmission of this data to the VBC. In the VBC, as shown in FIG. 3, this encoded information is decoded by a decoder 301 which is supplied with the number VN from a store 302. The decoded data BCD and SG are stored in respective parts of a register 303, and the decoded variables DK and ICK are stored in the store 302. In this manner, the variables DK and ICK are supplied securely from the DCC to the VBC.

A pseudo-random number generator 304 in the VBC generates a pseudo-random number which constitutes the second variable PD, which is stored in a further part of the register 303. A logic circuit 305 is supplied with the variable PD and the data BCD and SG which are stored in the register 303, and combines and encodes these in accordance with the variable ICK supplied from the store 302 to produce integrity check data IC, which is stored in a further part of the register 303. The data stored in the register 303 is transmitted each field of the video signal to each home terminal HT.

The variable PD, delayed by the duration of one video field in a delay unit 306 to allow time for processing the information in the register 303, is supplied to a control logic unit 307. The unit 307 is also supplied with the relevant variable DK for the type of video signal (television program group) which is to be scrambled, which is supplied from the store 302 which in turn is addressed by the data SG stored in the register 303. The unit 307 produces from the variables DK and PD a scrambling control signal on a line 308, in accordance with which the video signal is scrambled. The scrambling, and also the data transmission, are preferably effected in the manner described in the copending application by J. A. Bond et al. already referred to.

The store 204 in the DDC also stores the subscriber number SN of each HT. Recurrently, for example monthly, a polling control unit 206 in the DDC establishes communication with each HT via an HT selection path 207, and via the telephone central office 18 as described with reference to FIG. 1. The polling control unit 206 also addresses the store 204 via a path 208 to read out to an encoder 209 and a decoder 210 the subscriber number SN of the HT with which communication is established. Correspondingly, the number SN in the relevant HT (FIG. 4) is supplied from a store 401, in which it is permanently stored, to an encoder 402 and a decoder 403.

During communication between the DCC and the HT, billing information from a store 404 in the HT is encoded by the encoder 402 in dependence upon the number SN from the store 401, is transmitted to the DCC, and is decoded by the decoder 210 in dependence upon the same number SN from the store 204. The decoded billing information is stored in a billing data store 211, which via a path 212 informs the polling control unit 206 of this. The billing data store 211 can be accessed by means not shown, as required for billing the subscriber for pay TV programs which have been unscrambled. Furthermore, during the communication between the DCC and the HT, the variable ICK, and the variable DK for each group SG of television programs to which the relevant subscriber subscribes, are supplied from the store 202, encoded by the encoder 209 and decoded by the decoder 403 in accordance with the subscriber number SN supplied from the stores 204 and 401 respectively, and are stored in the store 401. In this manner, information is transmitted in both directions between the DCC and the HT, encoded in accordance with the subscriber number SN to make it secure.

For unscrambling a scrambled video signal, the information BCD, SG, PD, and IC transmitted from the VBC for each field of the video signal is stored for each field in a register 405 in the HT. The data BCD is supplied from the register 405 and stored in the store 404 to provide billing information for later transfer to the billing data store 211 as described above. In addition, a logic circuit 406 is supplied with the variable PD and the data BCD and SG from the register 405, and combines and encodes these in accordance with the variable ICK supplied from the store 401 to produce further data for checking the integrity of the data in the register 405. This further data is checked against the data IC from the register 405 in a checking circuit 407. For example, the logic circuit 406 can be identical to the logic circuit 305 in the VBC so that this further data is the data IC, in which case the checking circuit 407 can be a data comparator. Alternatively, the circuit 407 could produce the complement of IC and the circuit 407 could comprise a gating circuit.

If the checking ciruit 407 establishes the proper integrity of the data in the register 405, then via a lead 408 it enables a control logic unit 409. The unit 409 is supplied with the variable PD from the register 405, delayed in a delay unit 410 by the duration of one field of the video signal to allow time for processing the data in the register 405, and with the relevant variable DK which is read out from the store 401 which is addressed by the data SG in the register 405. When enabled, the unit 409 produces on a path 411 an appropriate unscrambling control signal for correct unscrambling of the relevant video signal field.

If the checking circuit 407 detects an error in the data for a particular field, then via a line 412 it triggers a pseudo-random number generator 413 to supply to the delay unit 410 a correct version of the variable PD, rather than the variable PD from the register 405. To this end, the generator 413 is identical in form to the corresponding generator 304 in the VBC, and is also synchronized by the variable PD being supplied thereto from the register 405 so that the generator 413 can at any time produce the correct variable PD. In addition, the checking circuit 407 supplies via a line 414 an indication to the store 404 that an error has occurred; such indications are accumulated in the store 404, an error count being incremented in response to each error indication, and the accumulated error count is read and reset by the DCC simultaneously with the transfer of billing information from the store 404 to the store 211. In the event that the error count reaches a predetermined value, indicating a fault or interference with the equipment, the store 404 provides a signal via a line 415 to inhibit the control logic unit 409 from further production of the proper unscrambling control signal. This signal on the line 415 can also be provided in response to an indication which can be entered into the store 404 in the event that the unscrambling equipment is tampered with in any way, for example if an equipment cover is opened.

It will be seen from the foregoing description that the invention provides a particularly secure manner of controlling scrambling and unscrambling in a pay TV system. The security of the system may, however, be further enhanced by protecting the contents of the stores in the DCC from unauthorized access, and by changing the variables DK and ICK more frequently. The size (e.g. number of bits) of these variables and the nature of the logic functions 305, 307, 406, and 409, as well as the size of the numbers VN and SN and the nature of the encoding and decoding functions, can obviously be selected arbitrarily to suit particular requirements.

Whilst the use of the variable ICK and the resultant production of the data IC to check the integrity of the data transmitted by the VBC has been described above, it should be appreciated that these features could be dispensed with without departing from the broadest aspects of this invention as claimed. Furthermore, the variables DK and ICK could obviously be stored in the VBC and/or the HT in their encoded forms if desired, and be decoded when required. The various logic circuits and encoding and decoding functions can be implemented using either hardware or software. Numerous other modifications, variations, and adaptations may be made to the described embodiment without departing from the scope of the invention as defined in the claims.

I claim:

1. A method of controlling scrambling and unscrambling of a video signal in a pay TV system, comprising the steps of:
   storing a subscriber number at a subscriber station;
   recurrently transmitting to the subscriber station a first variable encoded in dependence upon the subscriber number;
   decoding the first variable at the subscriber station using the stored subscriber number, and storing the first variable before or after said decoding;
   scrambling the video signal in dependence upon the first variable and a second variable;
   transmitting the second variable to the subscriber station simultaneously with transmission of the scrambled video signal; and
   at the subscriber station, unscrambling the video signal in dependence upon the decoded stored first variable and the transmitted second variable.

2. A method as claimed in claim 1 wherein said first variable is stored after said decoding.

3. A method as claimed in claim 1 and comprising the step of producing the first variable using a random number generator.

4. A method as claimed in claim 1 and comprising the step of producing the second variable for each field of the video signal using a pseudo-random number generator.

5. A method of controlling scrambling and unscrambling of a video signal in a pay TV system, comprising the steps of:
   storing a subscriber number at a subscriber station;
   scrambling the video signal in dependence upon first and second variables;
   recurrently transmitting to the subscriber station the first variable and a third variable each encoded in dependence upon the subscriber number;
   decoding the first and third variables at the subscriber station using the stored subscriber number, and storing the first and third variables before or after said decoding;
   producing check data from the second and third variables;
   transmitting the second variable and the check data to the subscriber station simultaneously with transmission of the scrambled video signal; and
   at the subscriber station, generating check data from the transmitted second variable and decoded stored third variable, enabling unscrambling of the video signal in dependence upon a comparison of this generated check data with the transmitted check data, and unscrambling the video signal in dependence upon the decoded stored first variable and the transmitted second variable.

6. A method as claimed in claim 5 wherein said first and third variables are stored after said decoding.

7. A method as claimed in claim 5 and comprising the step of producing said first and third variables using a random number generator.

8. A method as claimed in claim 5 and comprising the step of producing said second variable for each field of the video signal using a pseudo-random number generator.

9. A method as claimed in claim 8 and comprising the steps of additionally producing said second variable for each field of the video signal using a pseudo-random number generator at the subscriber station, synchronizing the production of said second variable at the subscriber station with said transmitted second variable, and unscrambling the video signal in dependence upon the decoded stored first variable and the second variable generated at the subscriber station in the event that the check data comparison indicates an error.

10. A method as claimed in claim 9 and including the steps of storing an accumulated error count at the subscriber station, incrementing said count in response to errors indicated by the check data comparison, and inhibiting unscrambling of the video signal in response to said count reaching a predetermined value.

11. A method as claimed in claim 1 or 5 and comprising the steps of:
   producing different said first variables for different types of television program;
   selectively recurrently transmitting said different first variables to the subscriber station for decoding and storage therein;
   scrambling the video signal in dependence upon the respective first variable, for the type of television program to which the video signal relates, and the second variable;
   transmitting, with said second variable, data representing the type of television program to which the scrambled video signal relates; and
   at the subscriber station, selecting the respective decoded stored first variable in dependence upon said data representing the type of television program for unscrambling the video signal.

* * * * *